United States Patent [19]

Beard et al.

[11] Patent Number: 4,626,353
[45] Date of Patent: Dec. 2, 1986

[54] SIDE SKIMMER FOR USE IN A CHANNEL

[76] Inventors: Harold J. Beard; Raleigh L. Cox, both of P.O. Box 3838, Baton Rouge, La. 70821

[21] Appl. No.: 784,153

[22] Filed: Oct. 4, 1985

[51] Int. Cl.⁴ .......................... B01D 17/00; C02F 1/40
[52] U.S. Cl. .................................... 210/519; 210/523; 210/926
[58] Field of Search ............... 210/154, 170, 926, 519, 210/525, 540, 523, 776

[56] References Cited

U.S. PATENT DOCUMENTS

| | | | |
|---|---|---|---|
| 3,779,385 | 12/1973 | Strohecker | 210/154 |
| 4,226,717 | 10/1980 | Malm | 210/926 |
| 4,303,516 | 12/1981 | Stensel et al. | 210/525 |
| 4,362,625 | 12/1982 | Beard | 210/170 |
| 4,383,922 | 5/1983 | Beard | 210/170 |
| 4,457,844 | 7/1984 | Beard | 210/624 |

Primary Examiner—Richard V. Fisher
Assistant Examiner—Linda S. Evans
Attorney, Agent, or Firm—Robert C. Tucker; William David Kiesel; J. Bradley Overton

[57] ABSTRACT

A side skimmer provided in a channel containing flowing liquid includes a skimmer mechanism and a skimmer drain. The skimmer mechanism includes a fixed portion secured in a hinge-like manner to one side of the channel and aligned with an obstruction located partially across the channel width, and a movable wing-like portion extending above and below the liquid surface. This mechanism selectively deflects the flow into the drain, and is movable between a closed position, which allows free flow between the mechanism in the channel side and the obstruction, and an open position between the fixed portion and the obstruction, which directs flow to the skimmer drain. The skimmer drain is vertically movable between a closed position above the liquid surface, and an open position just below the surface whereby floating matter is removed.

5 Claims, 3 Drawing Figures

SIDE SKIMMER FOR USE IN A CHANNEL

BACKGROUND OF THE INVENTION

1. Field of the Invention

This invention relates generally to devices which skim the surface of flowing liquids and, more particularly to devices which skim floating matter from the surface of oxidation ditches.

2. Prior Art

In oxidation ditch sewage treatment systems, or other such systems in which sewage is circulated through some type of channel, it is desirable to skim floating matter from the surface of the water flowing through the channel. This is especially true in systems which utilize intra-channel clarification. Examples of systems utilizing intra-channel clarification can be found in U.S. Pat. Nos. 4,303,516, 4,362,625, 4,383,922 and 4,457,844. Some clarifiers extend completely across the channel, while others allow flow around one or both sides of the clarifier. In such systems it is desirable that floating matter be removed often in order to prevent clogging of the clarifier.

SUMMARY OF THE INVENTION

Therefore, it is an object of this invention to provide an improved skimmer system for use in channels containing flowing liquids.

It is another object of this invention to provide such a skimmer system which will capture floating matter in the channel and transmit it outside the channel.

It is still another object of this invention to provide such a skimmer system which will operate external to an intra-channel clarifier in an oxidation ditch.

It is a further object of this invention to provide such a skimmer system which is economical and easy to operate from a remote position.

Accordingly, a side skimmer is provided for use in a channel containing flowing liquid, the channel having at least two sides, a bottom and containing an obstruction at least partially across the width of the channel and extending above and below the surface of the flowing liquid, comprising a skimming mechanism, for skimming the surface of the flowing liquid, having a fixed portion fixedly connected to one side of the channel and aligned with the obstruction, and having a movable portion extending above and below the surface of the flowing liquid, selectively movable between a closed position so as to allow free flow between the skimming mechanism and the obstruction, and an open position between the fixed portion and the obstruction, and a skimmer drain, connected through one side of the channel just upstream of the movable postion and movable between an open position just below the surface of said flowing liquid and a closed position.

DETAILED DESCRIPTION OF PREFERRED EMBODIMENTS OF THE INVENTION

Figure 1:
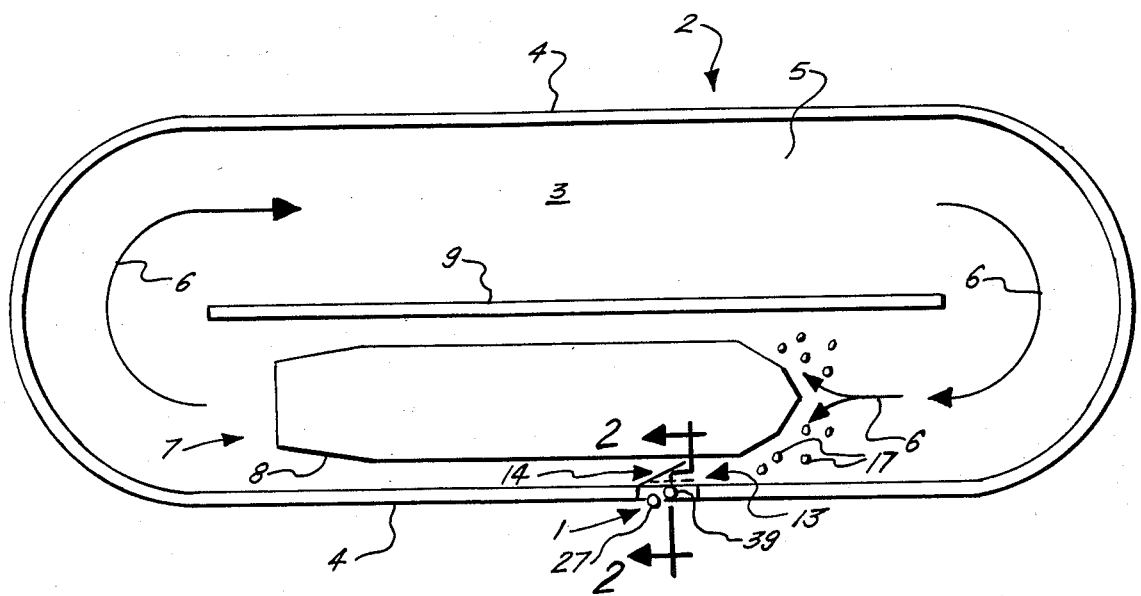
FIG. 1 is a top view of a preferred embodiment of the invention in place in an oxidation ditch.
Figure 2:
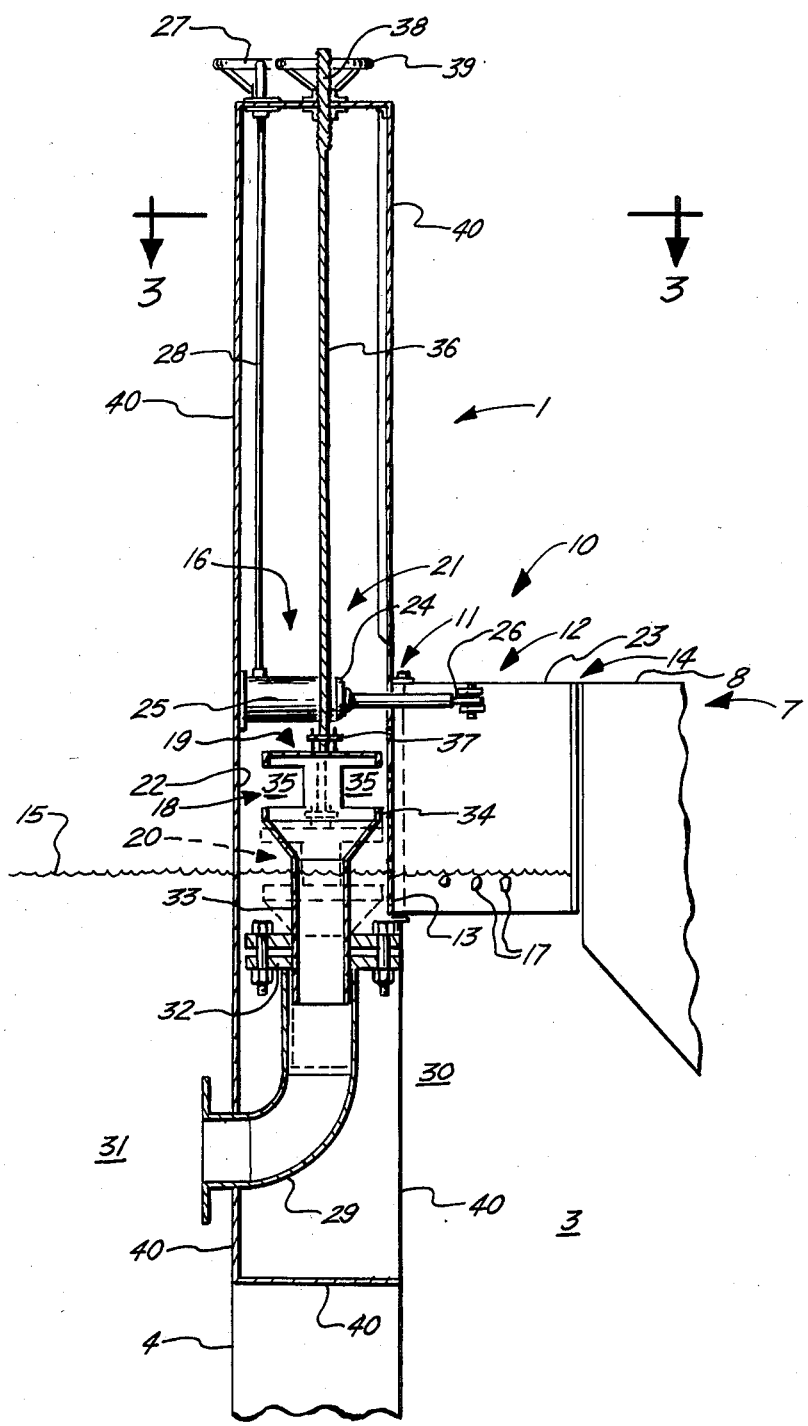
FIG. 2 is a sectional view taken along line 2—2 of FIG. 1.
Figure 3:
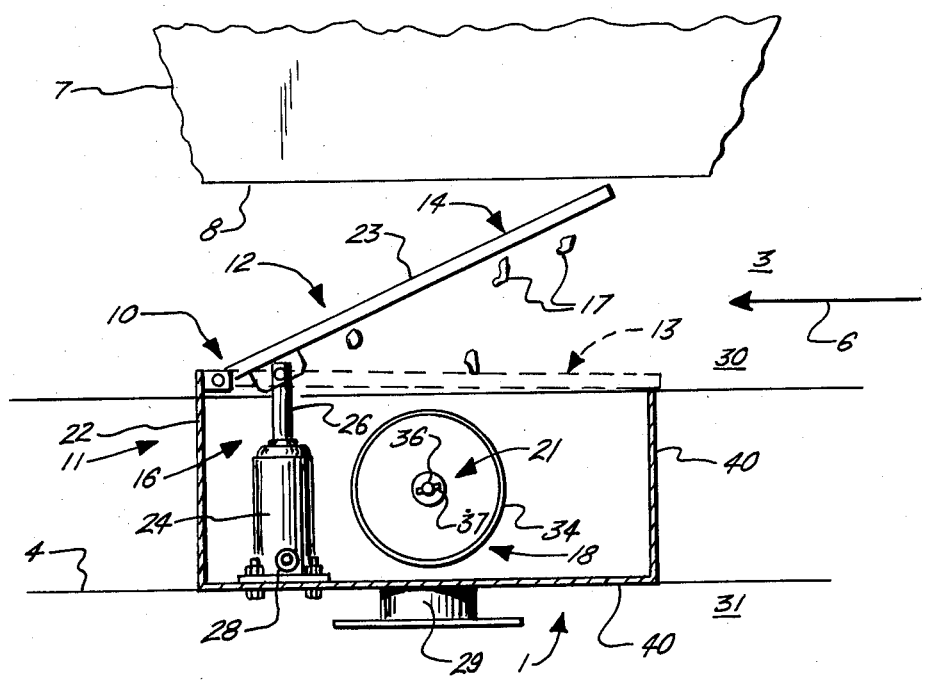
FIG. 3 is a sectional view taken along line 3—3 of FIG. 2.

As shown in FIG. 1, a typical oxidation ditch 2 comprises a circuitous channel 3 having sides 4, 9 and bottom 5. Liquid (usually raw sewage) is circulated in the ditch 2, as indicated by flow arrows 6. Various devices may be installed in the channel 3 for various purposes, acting as obstructions 7 to flow. For purposes herin, "obstruction" shall mean any device or object partially traversing the width of the channel 3 and extending above and below the surface of the flowing liquid. One such obstruction 7 could be an intrachannel clarifier 8. The clarifier 8 shown in FIG. 1 is positioned generally in the center of channel 3, allowing surface flow (and thus, the flow of floating matter 17) around both sides of clarifier 8. Some intra-channel clarifiers extend from one side of the channel (such as side 9) partially across the width of the channel, forcing all of the surface flow around one side of the clarifier. The side skimmer 1 is connected to one side 4 and is aligned with an obstruction 7 in the channel, such as clarifier 8. As shown in FIGS. 2 and 3, the side skimmer 1 comprises a skimming means 10 having a fixed portion 11 fixedly connected to side 4, and a movable portion 12 which is selectively movable between a closed position 13 and an open position 14. The movable portion 12 should extend above and below the normal liquid surface 15 so as to skim the liquid surface 15 when in open position 14. A first remote means 16 is provided to move the movable portion 12.

In order to remove skimmed floating matter 17, a skimmer drain 18 is provided just upstream of skimming means 10. When removal of floating matter 17 is necessary, the skimmer drain 18 is movable between a closed position 19 and an open position 20. A second remove means 21 is provided to move skimmer drain 18 between closed position 19 and open position 20. In open position 20, the skimmer drain 18 is just below the liquid surface 15, so as to establish a flow of floating matter 17 while not removing an excessive amount of liquid from the ditch 2. Skimmed liquid flows through skimmer drain 18 to a point outside the ditch 2.

It is preferable that the fixed portion 11 of skimming means 10 comprise a plate 22 extending at least above and below the liquid surface 15 such that, when the movable portion 12 of skimming means 10 is in open position 14 and skimmer drain 18 is in open position 20, flow of floating matter will not bypass the side skimmer 1. The movable portion 12 of skimming means 10 preferably comprises a hinged wing 23 which may be opened to a point of contact or near contact with clarifier 8 or other such obstruction 7. First remote means 16 preferably comprises a jack 24 fixedly connected at one end 25 to the fixed portion 11 of skimming means 10 or to channel side 4. The other end 26 of jack 24 is pivotally connected to wing 23. The jack 24 is operated by turning first handle 27, which is in turn fixedly connected to first rod 28, which is operably connected to jack 24. Skimmer drain 18 preferably comprises a first conduit 29 communicating between the interior 30 of the channel 2 and the exterior 31 of the channel 2 and then turning upward. A sliding connection, provided by flange 32 allows second conduit 33 to slidingly and sealingly move within the first conduit 29. Second conduit 33 is provided with a flared section 34 having openings 35 which provide an entry point for skimmed liquid and floating matter 17. Second remote means 21 preferably comprises a second rod 36 which is connected to second conduit 33 by means such as a pin 37 so as to raise and lower second conduit 33. Second rod 36 is provided with a threaded end 38 which is threadably connected to a second handle 39 which, when rotated, will raise and lower second conduit 33.

Operation of the side skimmer 1 is accomplished by turning first handle 27 until wing 23 opens to open position 14. Floating matter will begin to build up on wing 23. Second handle 39 is then turned, moving second conduit 33 to open position, allowing floating matter 17 to move toward and flow into skimmer drain 18 and out of the ditch 2. When skimming is complete, the operator simply returns wing 23 and second conduit 33 to their respective closed positions 13, 19. In the embodiment shown in the Figures, the side skimmer 1 will skim one-half of the flow in the ditch 2.

In order to better protect the moving parts of the side skimmer 1, it is preferred that a housing 40 be provided to encase the first remote means 16, second remote means 21 and skimmer drain 18. Of course, other means of controlling the movable portion 12 and skimmer drain 18 may be provided as suits the particular situation. These and other embodiments of the invention will occur to those skilled in the art and are intended to be included within the scope and spirit of the following claims.

I claim:

1. A side skimmer in combination with a channel containing flowing liquid, said channel having at least two sides, a bottom and containing an obstruction partially across the width of said channel and extending above and below the surface of said flowing liquid, comprising:
    a. a skimming means, for skimming said surface of said flowing liquid, having a fixed portion extending above and below said surface of said flowing liquid, fixedly connected to one side of said channel and aligned with said obstruction, and having a movable portion extending above and below said surface of said flowing liquid, selectively movable between a closed position so as to allow free flow between said skimming means and said obstruction, and an open position between said fixed portion and said obstruction; and
    b. a skimmer drain, connected through one said wall of said channel just upstream of said skimming means and movable between an open position just below said surface of said flowing liquid and a closed position.

2. A side skimmer according to claim 1, wherein said movable portion comprises a wing, hingedly connected to said fixed portion, and a first remote means, connected to said wing, for moving said wing between said open and closed positions.

3. A side skimmer according to claim 2, wherein said skimmer drain comprises a first conduit connected through one said side and turning upward on the interior of said side, a second conduit, slidingly and sealingly mounted inside said first conduit and extending upward to a point, when fully extended in said closed position, above said surface of said flowing liquid, and a second remote means, connected to said second conduit, for moving said second conduit between said open and closed positions.

4. A side skimmer according to claim 3, wherein said first remote means comprises a jack, fixedly connected at one end to said fixed portion of one said side and pivotally connected at the other end to said wing, and a jack handle, operably connected to said jack and extending to a desired operating area.

5. A side skimmer according to claim 4, wherein said skimmer drain comprises a first conduit connected through one said side and turning upward on the interior of said side, a second conduit, slidingly and sealingly mounted inside said first conduit and extending upward to a point, when fully extending in said closed position, above said surface of said flowing liquid, and a second remote means, connected to said second conduit, for moving said second conduit between said open and closed positions.

* * * * *